United States Patent
Adam et al.

(10) Patent No.: US 12,381,438 B2
(45) Date of Patent: Aug. 5, 2025

(54) ELECTRIC MOTOR AND RAIL VEHICLE

(71) Applicant: Siemens Mobility GmbH, Munich (DE)

(72) Inventors: Christoph Adam, Nuremberg (DE); Peter Seitz, Pommelsbrunn (DE)

(73) Assignee: Siemens Mobility GmbH, Munich (DE)

( * ) Notice: Subject to any disclaimer, the term of this patent is extended or adjusted under 35 U.S.C. 154(b) by 853 days.

(21) Appl. No.: 17/615,246

(22) PCT Filed: May 13, 2020

(86) PCT No.: PCT/EP2020/063254
§ 371 (c)(1),
(2) Date: Nov. 30, 2021

(87) PCT Pub. No.: WO2020/239439
PCT Pub. Date: Dec. 3, 2020

(65) Prior Publication Data
US 2022/0239188 A1   Jul. 28, 2022

(30) Foreign Application Priority Data

May 31, 2019  (DE) .................... 10 2019 208 001.4

(51) Int. Cl.
*H02K 5/15* (2006.01)
*B60L 50/51* (2019.01)
*B61C 3/00* (2006.01)
*H02K 7/00* (2006.01)
*H02K 7/102* (2006.01)
(Continued)

(52) U.S. Cl.
CPC ................ *H02K 5/15* (2013.01); *B60L 50/51* (2019.02); *B61C 3/00* (2013.01); *H02K 7/006* (2013.01); *H02K 7/102* (2013.01); *H02K 9/19* (2013.01); *H02K 11/21* (2016.01); *H02K 11/33* (2016.01); *B60L 2200/26* (2013.01); *B60L 2240/421* (2013.01)

(58) Field of Classification Search
CPC .......... H02K 5/15; H02K 7/006; H02K 7/102; H02K 9/19; H02K 11/21; H02K 11/33; B60L 2240/421; B60L 2200/26; B60L 50/51; B61C 3/00
See application file for complete search history.

(56) References Cited

U.S. PATENT DOCUMENTS 7,527,113 B2 * 5/2009 Jenkins ..................... B60L 7/24
                                                          180/65.6
9,033,072 B2 * 5/2015 Aemisegger ............ F16H 13/02
                                                          180/14.2
(Continued)

FOREIGN PATENT DOCUMENTS

DE          2102494 A1    8/1971
DE   102008025512 A1    12/2009
(Continued)

*Primary Examiner* — S. Joseph Morano
*Assistant Examiner* — Cheng Lin
(74) *Attorney, Agent, or Firm* — Laurence A. Greenberg; Werner H. Stemer; Ralph E. Locher

(57) ABSTRACT

An electric motor for a rail vehicle has a rotational speed sensor. The rotational speed sensor is mounted to an end shield of the electric motor. A sensor wheel for the rotational speed sensor is mounted to a clutch of the electric motor.

11 Claims, 2 Drawing Sheets

(51) Int. Cl.
*H02K 9/19* (2006.01)
*H02K 11/21* (2016.01)
*H02K 11/33* (2016.01)

(56) References Cited

U.S. PATENT DOCUMENTS

| | | | |
|---|---|---|---|
| 10,056,802 B2* | 8/2018 | Kubota | H02K 7/006 |
| 10,491,072 B2* | 11/2019 | Kitamura | H02K 3/34 |
| 10,981,458 B2* | 4/2021 | Xu | H02K 31/00 |
| 2008/0190318 A1* | 8/2008 | Palais | B61C 3/00 |
| | | | 105/3 |
| 2018/0166953 A1* | 6/2018 | Han | H02K 5/203 |
| 2019/0181790 A1* | 6/2019 | Adam | H02P 3/04 |
| 2019/0389300 A1* | 12/2019 | Hoppe | B60K 6/30 |

FOREIGN PATENT DOCUMENTS

| | | |
|---|---|---|
| DE | 102010033269 A1 | 2/2012 |
| DE | 102013224654 A1 | 6/2015 |
| DE | 102017102733 A1 | 9/2017 |
| DE | 102017129269 A1 | 9/2018 |
| DE | 102017208157 A1 | 11/2018 |
| EP | 0582563 A1 * | 2/1994 |
| EP | 3226382 A1 | 10/2017 |
| GB | 1340106 A | 12/1973 |
| WO | WO 2018028867 A1 | 2/2018 |

* cited by examiner

ELECTRIC MOTOR AND RAIL VEHICLE

FIELD AND BACKGROUND OF THE INVENTION

The invention relates to an electric motor for a rail vehicle, having a rotational speed sensor. The electric motor is provided in particular for driving the rail vehicle. The invention further relates to a rail vehicle.

For controlling an electric motor, for example position sensors or rotational speed sensors can be used. In the case of rail vehicles, rotational speed sensors are used in particular. A rotational speed sensor, for example, scans the teeth of a sensor wheel which is connected to the rotor of the electric motor. In this way, the rotational speed, the angular position and/or the direction of rotation of the rotor as well as variables derivable therefrom can be determined.

SUMMARY OF THE INVENTION

One object according to at least one aspect of the invention is to specify an electric motor for a rail vehicle in which the components for regulating the electric motor are arranged in a space-saving manner. Furthermore, a rail vehicle with a space-saving electric motor should be specified.

These objects are achieved by an electric motor having the features as claimed or a rail vehicle having the features as claimed. Advantageous embodiments and developments of the invention are the subject matter of the dependent claims.

According to at least one embodiment, the electric motor has a rotational speed sensor, the rotational speed sensor being mounted on an end shield of the electric motor. Furthermore, a sensor wheel for the rotational speed sensor is advantageously mounted on a coupling of the electric motor.

The electric motor is provided in particular for driving a rail vehicle. The coupling is provided to connect a rotor shaft of the electric motor to a wheelset shaft or a transmission input shaft of the rail vehicle. In the case of a gearless drive, the coupling can be located between the motor and the wheelset shaft, or in the case of a drive with a gear, between the motor and the gear. The coupling can compensate for a relative movement between the motor shaft and the wheelset shaft or gear shaft. In particular, the coupling can be a curved-tooth coupling.

The at least one rotational speed sensor is configured to determine the rotational speed of the rotor shaft. Furthermore, it is possible for the rotational speed sensor or another rotational speed sensor to determine, for example, the angular position and/or the direction of rotation of the rotor. One or more of these measured variables can be processed, for example, by a control unit for controlling the electric motor. In order to determine the rotational speed, the angular position and/or the direction of rotation of the rotor, the rotational speed sensor is configured to scan the teeth of a sensor wheel which is connected to the rotor.

According to one embodiment of the electric motor, the rotational speed sensor is mounted on an outer side of an end shield of the electric motor. The end shield delimits a housing of the electric motor to the outside. The end shield forms an end wall of the housing, in particular in the axial direction, i.e. in the direction of the rotor shaft. The rotational speed sensor is mounted on the outside of the end shield, that is to say in particular not inside the housing of the electric motor. Mounting the rotational speed sensor on an outer side of the end shield has the particular advantage that the rotational speed sensor is not exposed to the heat inside the electric motor but is arranged in the cooler outer area. As considerable heat is generated during the operation of an electric motor for driving a rail vehicle on account of the comparatively high output, this installation position is particularly advantageous for an electric motor of a rail vehicle. In addition, the rotational speed sensor is well protected from stone impact when it is mounted on the end shield.

According to one embodiment, the sensor wheel for the rotational speed sensor is mounted on the coupling. The integration of the sensor wheel into the coupling is advantageous in terms of cost savings and weight. In particular, no additional installation space is required for the sensor wheel in the axial direction, i.e. in the direction of the rotor shaft, as a result of the arrangement on the coupling. This is particularly advantageous for an electric motor in a rail vehicle as the electric motor is arranged in a bogie in which space is limited. The electric motor can in particular be mounted in the bogie transversely to the direction of travel, parallel to the wheelset shaft.

According to at least one embodiment, the end shield on which the rotational speed sensor is mounted is the drive-side end shield. The drive-side end shield delimits the housing of the electric motor on the drive side on which the coupling to the wheelset shaft is arranged. The arrangement of the rotational speed sensor on the drive side is particularly advantageous in the case of an electric motor which does not have a fan to which a sensor wheel could be attached.

According to at least one embodiment, the rotational speed sensor is fastened to a threaded blind hole in the end shield. In this embodiment, advantageously no through bores are necessary in the end shield or motor housing in order to fasten the rotational speed sensor. To fasten the rotational speed sensor to the threaded blind hole, an adapter can be used, for example, which receives the rotational speed sensor and is screwed into the threaded blind hole.

According to at least one embodiment, the electric motor has a plurality of rotational speed sensors mounted on the end shield. Mounting on the end shield advantageously offers the possibility of arranging a plurality of rotational speed sensors which scan the same sensor in a space-saving manner. The plurality of rotational speed sensors can advantageously be signal transmitters for various control functions, for example drive control, brake control or standstill detection.

According to at least one embodiment, the plurality of rotational speed sensors are each fastened to a threaded blind hole in the end shield, for example with adapters which are screwed into the threaded blind holes. The plurality of threaded blind holes can advantageously be produced in a single machine setup.

According to at least one embodiment, the sensor wheel has at least 150 teeth or preferably at least 200 or even at least 300 teeth. In this way, the rotational speed or angular position of the rotor can advantageously be determined with a high resolution. The toothing of the sensor wheel can be, for example, a rectangular toothing or an involute toothing.

According to at least one embodiment, the electric motor is a water-cooled electric motor. The arrangement of the rotational speed sensor on the drive-side end shield is advantageous in the case of a water-cooled electric motor because this does not have a fan on which a sensor wheel could be attached.

According to at least one embodiment, the electric motor has an output of at least 500 kW. A torque of the electric motor is preferably at least 9000 Nm. The electric motor can be a high-performance motor for a train, in particular for a high-speed train with a possible speed of at least 200 km/h or even at least 300 km/h. In such a high-performance motor, the arrangement of the rotational speed sensor outside the motor housing is advantageous due to the heat build-up. In particular, the electric motor can be a synchronous motor.

According to at least one embodiment, the electric motor has at least 4 poles. The number of poles can be, for example, between 4 and 24, preferably 8, 12 or 16. In such an electric motor, the arrangement of the rotational speed sensor outside the housing is advantageous as there is only a very small amount of installation space available in the housing.

The invention further relates to a rail vehicle which has the electric motor described above. All of the possible embodiments of the electric motor described above can be implemented in the electric motor arranged in the rail vehicle and are therefore not described again at this point.

According to at least one embodiment, the rail vehicle is a high-speed train with a maximum speed of at least 200 km/h or even at least 300 km/h. In such a high-speed train, high-performance electric motors are used, in which the arrangement of the rotational speed sensor proposed herein on the end shield and the arrangement of the sensor wheel on the coupling is particularly advantageous.

The aforementioned properties, features and advantages of the invention and the manner in which they are achieved are explained in more detail by the following description of the exemplary embodiments of the invention in conjunction with the corresponding figures.

BRIEF DESCRIPTION OF THE FIGURES

Identical or identically acting components are each provided with the same reference characters in the figures. The components shown and the ratios of the components to one another are not to be regarded as true to scale.

DETAILED DESCRIPTION OF THE INVENTION

Figure 1:
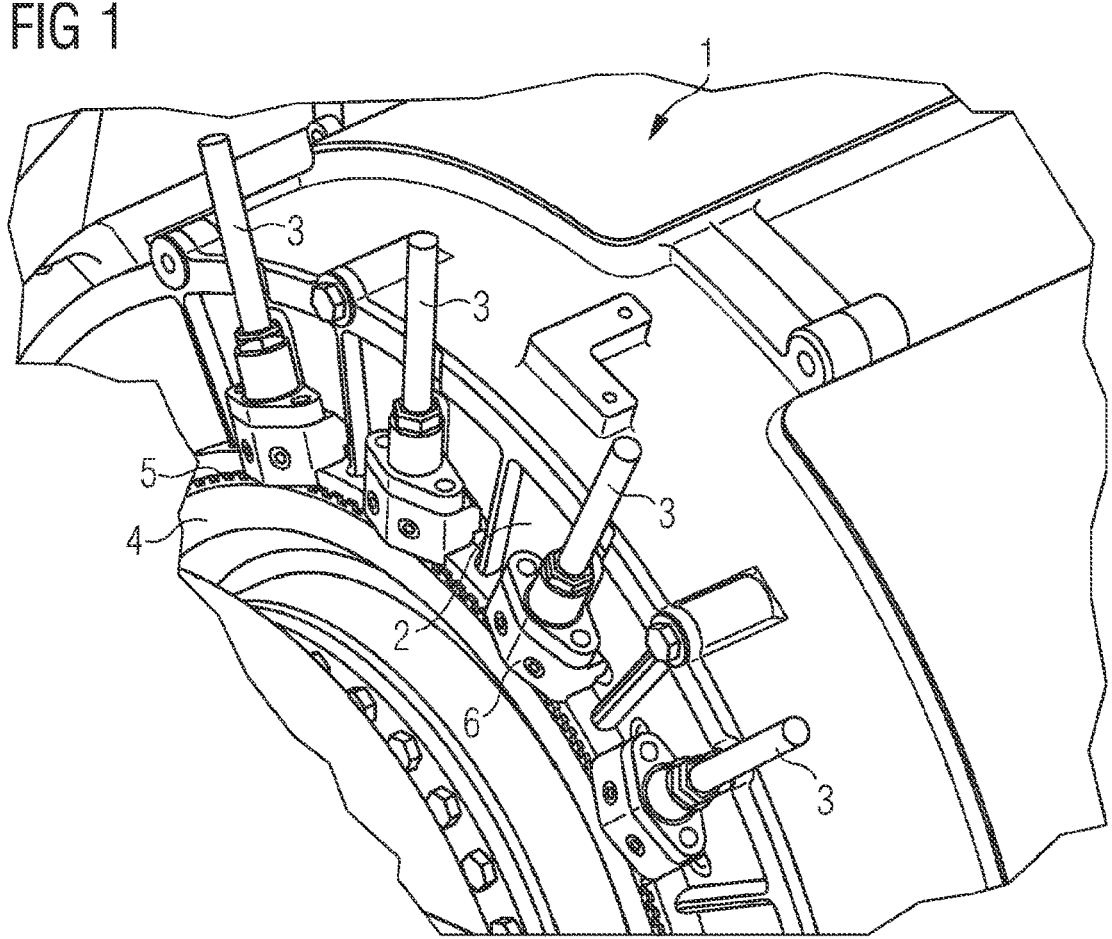
FIG. 1 shows a diagrammatic perspective view of an electric motor according to an exemplary embodiment.
Figure 2:
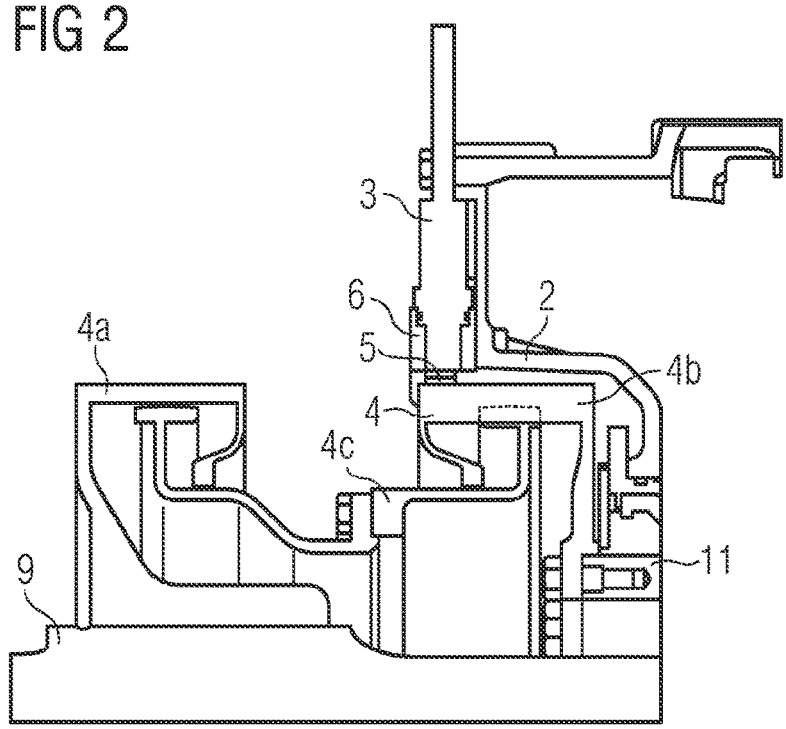
FIG. 2 shows a diagrammatic representation of a sectional view through part of the electric motor according to FIG. 1.

FIGS. 1 and 2 show an exemplary embodiment of the electric motor 1 for a rail vehicle in a perspective view and a sectional view. The electric motor 1 has a housing which is closed off on a drive side by an end shield 2. On the drive side, the electric motor 1 is connected to a wheelset shaft 9 of the rail vehicle by means of a coupling 4. The coupling 4 can in particular be a curved-tooth coupling.

The coupling 4 is used in particular to connect a rotor shaft 11 of the electric motor 1 to the wheelset shaft 9. In the present example, the coupling 4 is designed in several parts. The coupling 4 has a wheelset-side part 4a which is connected to the wheelset shaft 9. Furthermore, the coupling 4 has a motor-side part 4b which is connected to a rotor shaft 11 of the electric motor 1. A central part 4c of the coupling 4 is arranged between the motor-side part 4b and the wheelset-side part 4a. In the present example, the coupling 4 is a gearless coupling. Alternatively, it is possible for a gear to be arranged between the rotor shaft 11 and the wheelset shaft. In this case, the coupling is located between the motor and the gear.

In order to determine the rotational speed, the electric motor 1 has one or more rotational speed sensors 3. The at least one rotational speed sensor 3 is configured to scan the toothing of a sensor wheel 5 which is attached to the coupling 4. The sensor wheel 5 is preferably scanned inductively by the rotational speed sensor 3.

Alternatively, it would be possible for the rotational speed sensor 3 to optically scan the sensor wheel 5.

In particular, the sensor wheel 5 is arranged on the motor-side part 4b of the coupling 4, the motor-side part 4b of the coupling rotating with the rotor shaft 11. The rotary movement of the motor-side part 4b of the coupling therefore corresponds to the rotary movement of the rotor shaft 11. Scanning the toothing of the sensor wheel 5 makes it possible to determine the rotational speed and/or the angular position of the rotor or variables which can be derived therefrom. The toothing which forms the sensor wheel 5 is arranged in particular on an outer circumference of the motor-side part 4b of the coupling 4.

As can be seen in FIG. 1, the electric motor 1 can have a plurality of rotational speed sensors 3, for example four rotational speed sensors 3. The rotational speed sensors 3 can have various functions, for example they can be provided for drive control, for brake control or for standstill detection.

The arrangement of the sensor wheel on the coupling 4 has the advantage that no additional installation space is required for the sensor wheel 5 in the axial direction, i.e. in the direction of the rotor shaft and the wheelset shaft 9. The electric motor 1 is thus designed in a particularly space-saving manner.

In particular, the electric motor 1 can be a water-cooled motor which does not have a fan. The arrangement of the sensor wheel 5 on the coupling 4 is particularly advantageous in this case as there is no possibility of arranging the sensor wheel 5 on a fan.

The toothing of the sensor wheel 5 can be, for example, a rectangular toothing or an involute toothing. The module of the toothing is preferably at least 1.5 mm. In order to achieve a good resolution when determining the rotational speed and/or angular position of the rotor, the sensor wheel 5 preferably has at least 150, at least 200 or even at least 300 teeth.

The at least one rotational speed sensor 3 is mounted on an outer side of the drive-side end shield 2. For example, the rotational speed sensor 3 is mounted on the end shield 2 by means of an adapter 6 which is screwed into a threaded blind hole in the end shield 2. Alternatively, the rotational speed sensor can be screwed directly onto the end shield. The arrangement of the at least one rotational speed sensor 3 on an outer side of the end shield 2 has the particular advantage that the rotational speed sensor 3 is protected from high temperatures inside the motor housing. In addition, the rotational speed sensor is well protected from stone impact in the installation position on top of the end shield. In this way, a reliable and material-saving operation of the rotational speed sensor 3 is made possible. The electric motor 1 can in particular be a high-performance motor which has, for example, a torque of at least 9000 Nm and/or an output of at least 500 kW.

Figure 3:
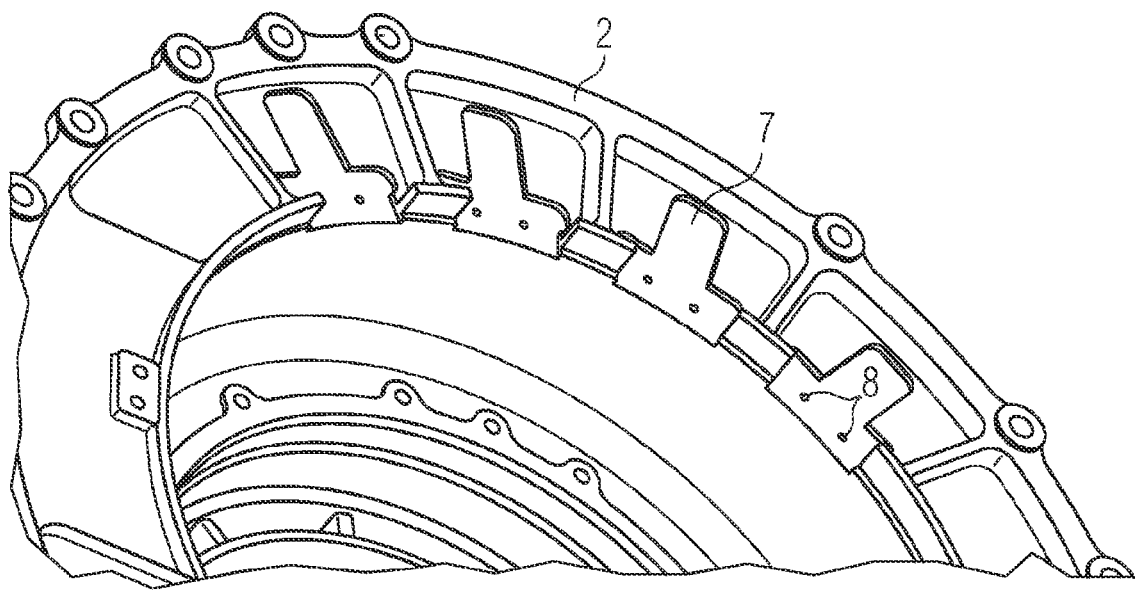
FIG. 3 shows a diagrammatic perspective view of the end shield in an exemplary embodiment of the electric motor.

FIG. 3 shows a perspective view of the end shield 2 in an exemplary embodiment of the electric motor 1.

The end shield 2 has mounting surfaces 7 for one or more rotational speed sensors. The mounting surfaces 7 can each have threaded blind holes 8 into which, for example, adapters can be screwed which can receive the rotational speed sensors. The plurality of threaded blind holes 8 can be advantageously produced in a single machine setup. Attaching the rotational speed sensor to threaded blind holes 8 in the end shield 2 has the advantage that no through bores are required in the end shield 2.

Figure 4:
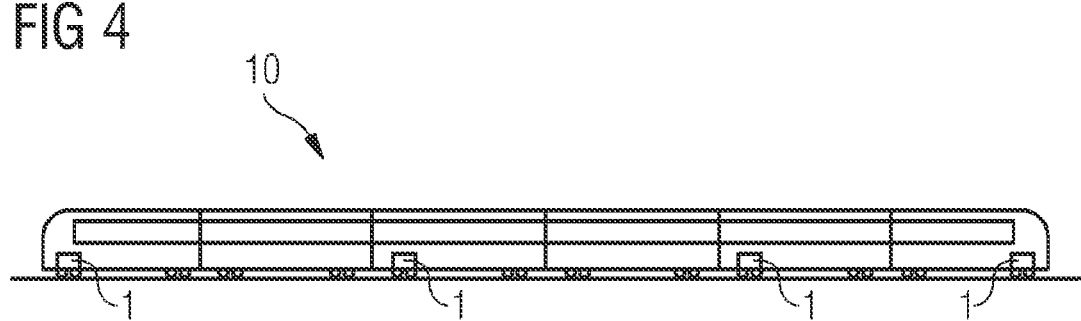
FIG. 4 shows a diagrammatic representation of a rail vehicle with the electric motor.

The electric motor 1 is provided in particular for driving a rail vehicle. FIG. 4 shows a diagrammatic representation of a rail vehicle 10. The rail vehicle 10 can have one or preferably a plurality of electric motors 1, each of which has one of the embodiments described above. The rail vehicle 10 is in particular a train in which the electric motor 1 described herein is installed in one or more carriages of the train. In particular, the rail vehicle 10 can be a high-speed train which, for example, has a maximum speed of at least 200 km/h or even at least 300 km/h.

Although the invention has been illustrated and described in detail with reference to exemplary embodiments, the invention is not limited to the disclosed exemplary embodiments and the specific combinations of features explained therein. Further variations of the invention can be obtained by a person skilled in the art without departing from the scope of the claimed invention.

LIST OF REFERENCE CHARACTERS

1 Electric motor
2 End shield
3 Rotational speed sensor
4 Coupling
4a Wheelset-side part of the coupling
4b Motor-side part of the coupling
4c Central part of the coupling
5 Sensor wheel
6 Adapter for rotational speed sensor mounting
7 Mounting surface
8 Threaded blind holes
9 Wheelset shaft
10 Rail vehicle
11 Rotor shaft

The invention claimed is:

1. An electric motor for a rail vehicle, the electric motor comprising:
   a housing;
   an end shield forming an end wall of said housing and delimiting said housing to the outside;
   a rotor shaft;
   a coupling connecting said rotor shaft to a wheelset shaft or a gear shaft of the rail vehicle and having a motor-side part connected to said rotor shaft;
   said motor-side part of the coupling being configured to rotate with the rotor shaft;
   a rotational speed sensor mounted on an outer side to said end shield; and
   a sensor wheel for said rotational speed sensor, said sensor wheel being mounted on said motor-side part of said coupling.

2. The electric motor according to claim 1, wherein said end shield is a drive-side end shield of the electric motor.

3. The electric motor according to claim 1, wherein said rotational speed sensor is fastened to a threaded blind hole of said end shield.

4. The electric motor according to claim 1, wherein said rotational speed sensor is one of a plurality of rotational speed sensors mounted on said end shield.

5. The electric motor according to claim 4, wherein each of said plurality of rotational speed sensors is fastened to a threaded blind hole formed in said end shield.

6. The electric motor according to claim 1, wherein said sensor wheel has at least 150 teeth.

7. The electric motor according to claim 1, wherein the electric motor is a water-cooled motor.

8. The electric motor according to claim 1, wherein the electric motor has an output of at least 500 kW.

9. The electric motor according to claim 1, wherein the electric motor has a torque of at least 9000 Nm.

10. A rail vehicle, comprising at least one electric motor according to claim 1.

11. The rail vehicle according to claim 10, wherein the rail vehicle is a high-speed train having a maximum speed of at least 200 km/h.

* * * * *